United States Patent
Eerkens (12)

(10) Patent No.: US 10,319,486 B2
(45) Date of Patent: Jun. 11, 2019

(54) PROCESS AND APPARATUS FOR CONDENSATION REPRESSING ISOTOPE SEPARATION BY LASER ACTIVATION

(71) Applicant: Jozef W. Eerkens, Woodland, CA (US)

(72) Inventor: Jozef W. Eerkens, Woodland, CA (US)

(*) Notice: Subject to any disclaimer, the term of this patent is extended or adjusted under 35 U.S.C. 154(b) by 1058 days.

(21) Appl. No.: 14/207,333

(22) Filed: Mar. 12, 2014

(65) Prior Publication Data

US 2014/0270035 A1   Sep. 18, 2014

Related U.S. Application Data

(60) Provisional application No. 61/780,964, filed on Mar. 13, 2013.

(51) Int. Cl.
*G21G 1/10* (2006.01)
*B01D 59/34* (2006.01)
*G21G 1/00* (2006.01)

(52) U.S. Cl.
CPC ............ *G21G 1/10* (2013.01); *B01D 59/34* (2013.01); *G21G 2001/0094* (2013.01)

(58) Field of Classification Search
CPC ... G21G 1/10; G21G 2001/0094; B01D 59/34
(Continued)

(56) References Cited

PUBLICATIONS

Eerkens, J.W. (2005) 'Laser-induced migration and isotope separation of epi-thermal monomers and dimers in supercooled free jets', Laser and Particle Beams, 23(2), pp. 225-253.*
(Continued)

*Primary Examiner* — Jack W Keith
*Assistant Examiner* — John T Nolan
(74) *Attorney, Agent, or Firm* — Temmerman Law Office; Mathew J. Temmerman

(57) ABSTRACT

Isotope enrichment by laser activation wherein a multi-isotopic element Q, like Uranium, Silicon, Carbon is incorporated into gaseous $QF_n$, $QF_6$, $QF_4$, $QO_mF_n$, etc and diluted in gas G like He, $N_2$, Ar, Xe, $SF_6$ or other inert gas; and wherein that mixture is cooled by adiabatic expansion or other means encouraging formation of dimers $QF_6$:G in a supersonic super-cooled free jet; and wherein that jet is exposed to laser photons at wavelengths that selectively excite predetermined molecules $^iQF_6$ to $^iQF_6^*$, thereby inducing rapid VT conversions and dissociations of $^iQF_6^*$: $G \rightarrow {}^iQF_6 + G + kT$, while leaving non-excited dimers $^jQF_6$:G intact; and wherein a skimmer separates the supersonic free-jet core stream containing heavier $^jQF_6$:G dimers from lighter core-escaped $^iQF_6$-enriched rim gases. Particularly an advanced technique is disclosed to enrich $^iUF_6$ by free jet expansion and isotope-selective dimerization suppression, utilizing a molecular CO laser and intra-cavity $UF_6$ irradiation with laser lines overlapping predetermined $^iUF_6$ absorptions; and providing multiple free jet separator units irradiated by one laser beam, thereby enhancing process economics.

20 Claims, 8 Drawing Sheets

(58) Field of Classification Search
USPC .......................................................... 376/195
See application file for complete search history.

(56) References Cited

PUBLICATIONS

Eerkens, Jeff W., and Jaewoo Kim. "Isotope separation by selective laser-assisted repression of condensation in supersonic free jets." AIChE journal 56.9 (2010): 2331-2337.*

Eerkens, J. W. "Isotope separation by condensation reduction of laser-excited molecules in wall-cooled subsonic gas streams." Nuclear science and engineering 150.1 (2005): 1-26.*

Eerkensb, Jeff W., Maeng-Ho Yang, and Chang-Kyu Rheea. "Current status of the MLIS Uranium Enrichment process." (2009).*

* cited by examiner

CW 5-Micron Laser System Components
Pulsed 16-Micron Laser System Components
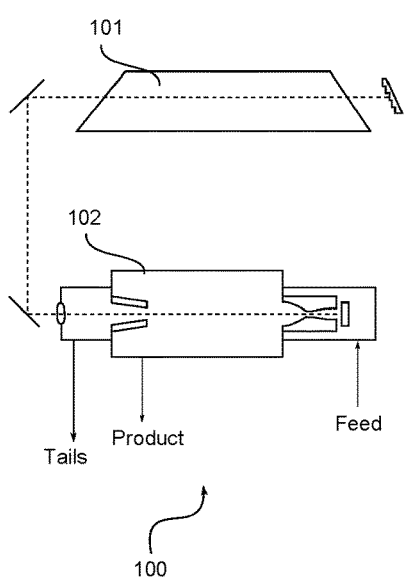
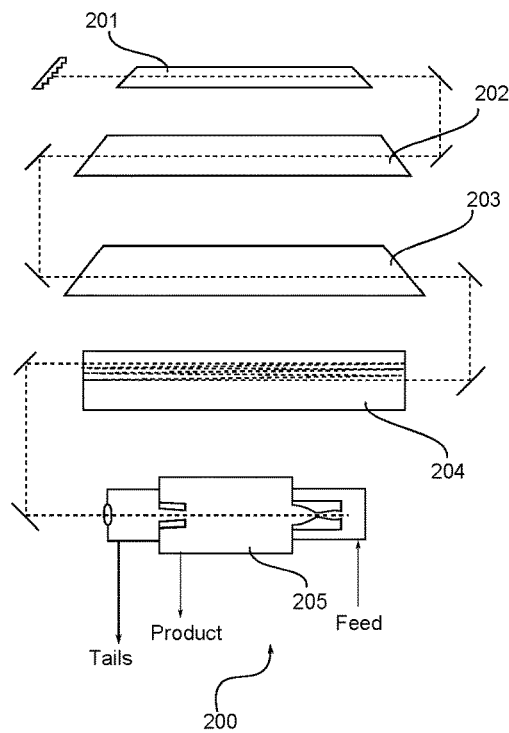
Fig. 1

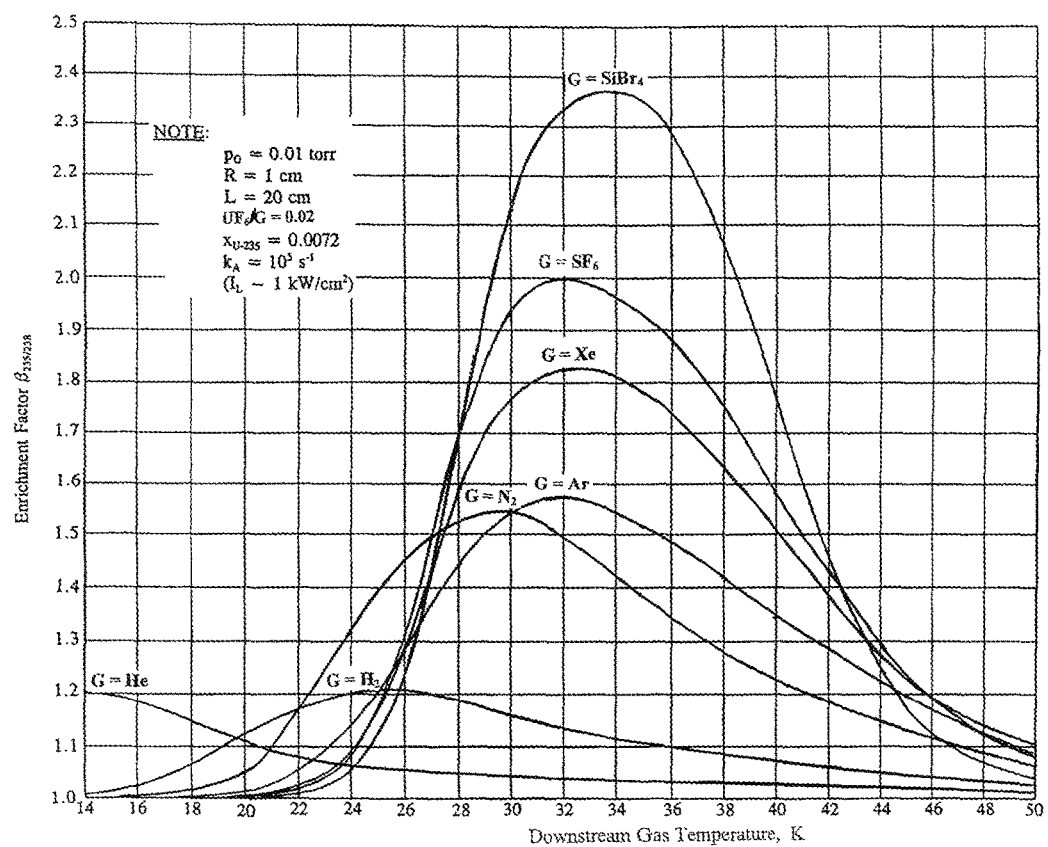
FIG. 4 CALCULATED CRISLA ENRICHMENT FACTORS FOR $UF_6/G$ MIXTURES
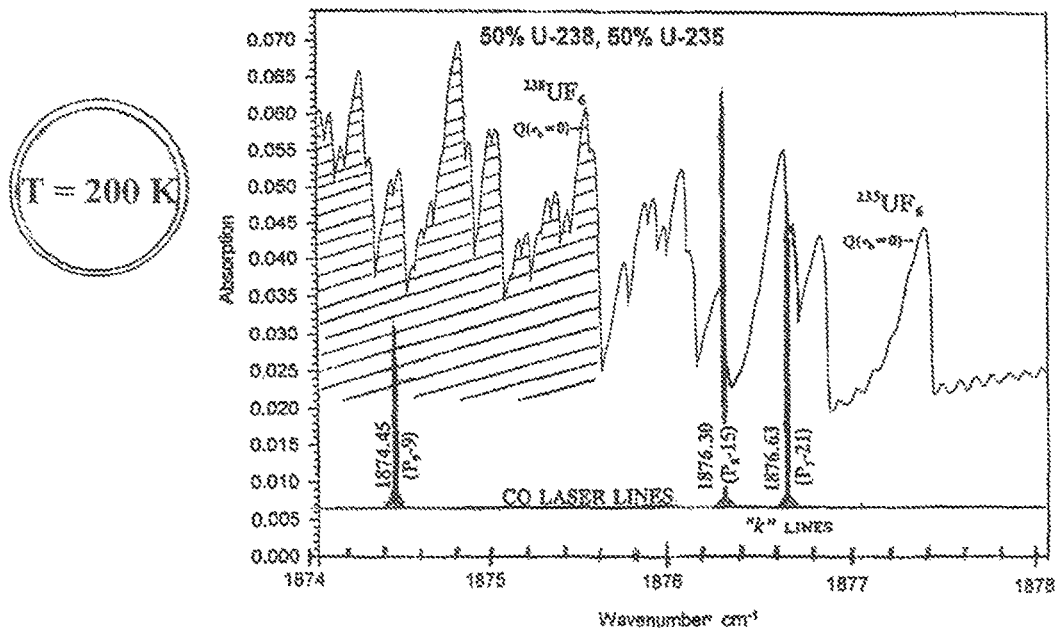
FIG. 5a

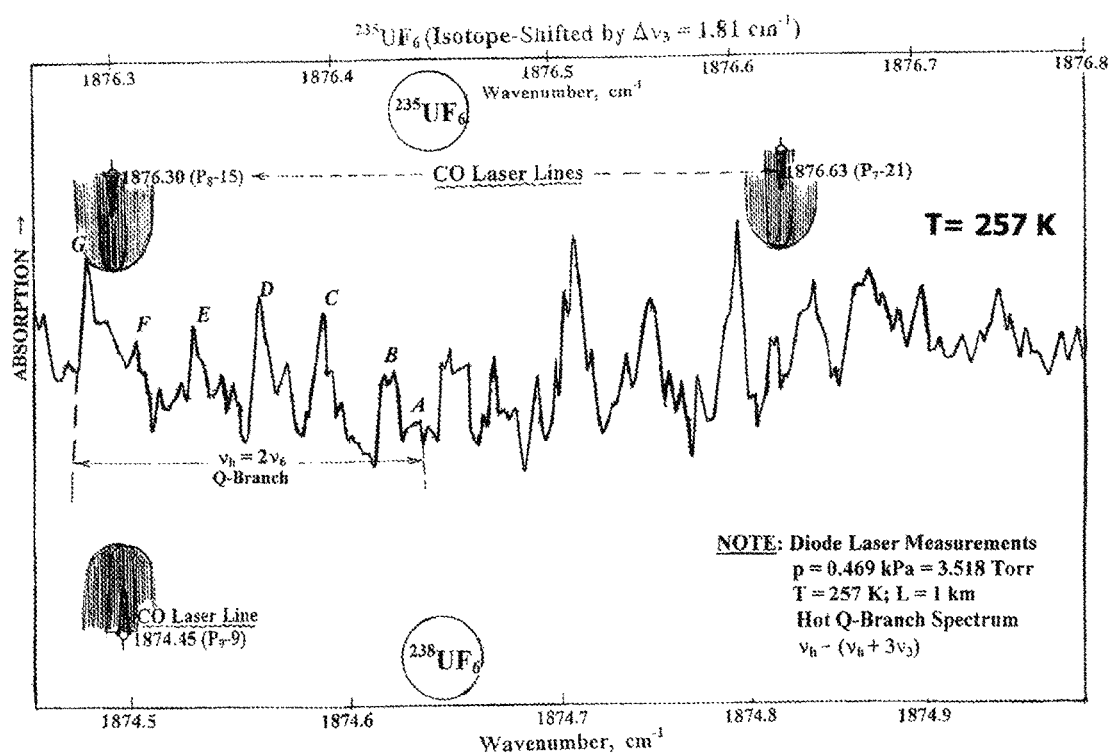
FIG. 6a MEASURED HIGH-RESOLUTION $UF_6(3\nu_3)$ HOT-BAND ABSORPTIONS AT T = 257 K.
[after G.A. Laguna, e.a., Chem Phys Lett 75(2), 357 (1980)]

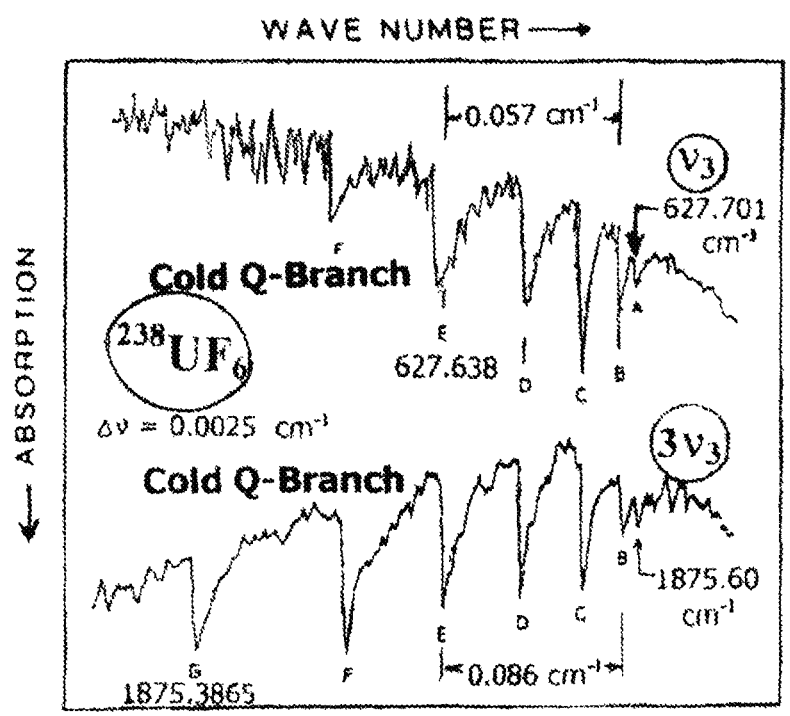
FIG. 6b MEASURED COLD Q-BRANCH SUB-BANDHEADS OF $UF_6(v_3)$ AND $UF_6(3v_3)$ AT T = 257 K
[after B.J. Krohn, e.a., J of Mol Spect 132, 285-309 (1988)]

PROCESS AND APPARATUS FOR CONDENSATION REPRESSING ISOTOPE SEPARATION BY LASER ACTIVATION

RELATED APPLICATIONS

This application claims priority from the U.S. provisional application with Ser. No. 61/780,964 filed on Mar. 13, 2013. The disclosure of the provisional application is incorporated herein as if set out in full.

BACKGROUND

Field of the Invention

This invention relates to the separation and enrichment of a predetermined isotope $^iQ$ of a multi-isotopic element Q (possessing isotopes $^iQ$, $^jQ$, $^kQ$, etc.), and in particular to a process and apparatus for condensation repressing isotope separation by laser activation.

Description of Related Art

Since the discovery of isotopes around 1925, (70+ of the 92 known elements have multiple isotopes) various methods have been developed to separate these isotopes. Because the isotopes of a given element behave the same chemically, and differ only by one or more mass units due to different neutron populations in their nuclei, the standard chemical separation techniques employed for separating different elements cannot be used. Until recently, the predominant isotope separation methods utilized have employed diffusion and centrifuging, both of which take advantage of the small mass differences between isotopes. While many separated isotopes have become important in materials research and in nuclear medicine, the largest application of isotope separation has been that of separating and enriching uranium. These separated and enriched uranium isotopes fuel nuclear fission power plants, in particular the U-233 and U-235 isotopes of uranium, as well as Pu-239 bred from U-238. Although breeder reactors may ultimately also consume the 99.3% of U-238 in natural uranium, for the next fifty years, enriching the U-235 present in natural uranium, from 0.7% to about 5% as required in nuclear reactor fuels, will remain a multi-kiloton isotope processing operation worldwide.

While gas centrifuge enrichment of uranium hexafluoride ($UF_6$) remains the primary enrichment process employed today (in 2013), after the discovery of the laser in 1960, a number of laboratories started to re-investigate the photon-induced separation of atomic uranium isotopes, a technique considered briefly during WWII, using the very narrow monochromatic spectral lines that the newly discovered lasers could provide. Such narrow monochromatic spectral lines allow for isotope-selective photon absorptions and excitations of isotopes, such as the isotopes of U-235 or U-238, due to small mass-dependent spectral isotope-shifts between different isotopes thereof. This approach to isotope separation promises larger isotope enrichments per stage than is possible with mass diffusion schemes. This research into laser photon isotope separation resulted in the expensive government-supported AVLIS and SILVA atomic-vapor enrichment programs in the USA, France, and elsewhere.

After the discovery, in the 1970s, of high-power $CO_2$, CO, HF, and other molecular lasers, attention turned to the possibility of employing such lasers for less costly molecular laser isotope separation (MLIS) schemes using gaseous $UF_6$ molecules instead of vaporized uranium atoms. Infrared molecular lasers can selectively excite vibrational energy levels in $^{235}UF_6$ or $^{238}UF_6$ isotopomers, either directly or via a wavelength-conversion medium. While atomic spectroscopy and lifetimes of electronic energy levels in uranium atoms were well understood, permitting rapid development of AVLIS programs, the rovibrational energy states and lifetimes of large molecules such as $UF_6$ were less known, and required additional research to understand. Besides molecular spectroscopy, several new mechanisms had to be taken into account, such as rotational transitions, intra- and extra-molecular vibrational energy conversions and transfers (VT, VV), and van der Waals dimer formations.

In general, a LIS process comprises two inter-dependent steps: (1) laser excitation, and (2) isotope harvesting. After one finds a laser that can successfully excite selected isotopomers in a gas or gas mixture, means must be found to rapidly remove excited species from the mixture before they loose their excitation. In AVLIS, where electronic excited states can only "live" for microseconds, rapid (nanosecond) consecutive laser excitations are employed that take an isotope from the ground level to the ionization level in two or three successive excitation steps with successive isotope-selective absorption of two or three resonant laser photons. The selectively ionized isotopes are then collected and separated from unexcited species by an electromagnetic field. In MLIS, where selectively excited vibrational states can exist for milliseconds or longer (depending on gas collision rates), several schemes have been developed to separate excited from non-excited isotopomers. One harvesting method involves molecular obliterations (MOLIS), which uses rapid (sub-microsecond) successive multi-photon absorptions "up the vibrational ladder" in an isotopomer until the isotopomer reaches its dissociation limit. Selectively dissociated non-volatile isotopomer products then react to form solid particles that are separable from non-excited gaseous species. In a second MLIS harvesting scheme, acceleration of chemical reactions between selected isotopomers and a (slowly reacting) co-reactant gas RX is sought (CHEMLIS), using laser photons to induce isotope-selective multi-level vibrational excitations that promote atomic re-arrangements in attachment complexes $UF_6$:RX. In this case, reaction products precipitate out or form solid particles, thereby permitting separation from unreacted gas.

In a third MLIS scheme, of greatest applicability to this application, dimer formation of $^iQF_6$ in a super-cooled supersonic free jet is selectively suppressed. The $^iQF_6$ gas is mixed as a minor component in a carrier gas G which has a favorable gas coefficient to provide rapid cooling of the supersonic free jet as it expands into a low-pressure evacuation chamber. Cooled-down selected $^iQF_6$ isotopomers in the jet are laser-excited, which inhibits their condensation in the free jet. This process has been dubbed CR-MLIS or CREMLIS for Condensation Repression Molecular Laser Isotope Separation. Non-laser-excited molecules will form $QF_6$:G dimers and tend to stay in the jet core. The heavier $QF_6$:G dimers may be separated with a skimmer from the previously laser-excited lighter $QF_6$ monomers in the expanding free jet which radially flee out of the jet core in greater abundance. Because the flow is supersonic, there is no back-streaming of gas from the skimmer into the vacuum chamber. As it enters the skimmer, the gas flow goes through a standing shock in the skimmer's mouth as it returns from supersonic to subsonic flow. In the case of $UF_6$, lighter laser-heated $^{235}UF_6$ (or $^{238}UF_6$) monomers are preferentially chased out of the central core region of a free supersonic jet, while heavier $UF_6$:G dimers stay mostly in the core. The skimmer then separates the jet's core gas from the isotope-enriched monomer rim gases. In the $UF_6$-specific laser enrichment processes known as SILARC or CRISLA and SILEX (SILARC=Separation of Isotopes by Laser Activated Repression of Condensation; CRISLA=Condensation Repression Isotope Separation by Laser Activation; and SILEX=Separation of Isotopes by Laser Excitation), the skimmer-caught dimers will dissociate again into gaseous monomers in the post-skimmer subsonic room-temperature collection chamber. This is due to the weakness of the van der Waals dimer bonds which last for only micro-seconds at room temperature, but which persist for milliseconds at low supersonic jet-cooled temperatures during the jet's typical 0.1 milliseconds of travel time through the vacuum chamber. The post-skimmer $UF_6$:G→$UF_6$+G dissociations allow continuous inter-stage cascade operations similar to those in Diffusion and Gas-Centrifuge uranium enrichment plants. On the other hand, in MOLIS or CHEMLIS processes, solid isotope-depleted or -enriched products are deposited on walls or scrubbers, which must be intermittently re-evaporated or re-fluorinated after a build-up of several particle layers. For this reason, CRISLA and SILEX selective dimerization repression or dimer association methods are much preferred in commercial applications.

Gaseous atoms and molecules when approaching each other are attracted to each other by so-called van der Waals forces which are proportional to the inverse sixth power of their separation. In collisions they would cling if it were not for the fact that they must shed their relative kinetic energy. At room temperature, most collisions therefore do not result in clinging (dimer formation), but cause a rebound after two species collide. However because the relative kinetic energies in collisions follow a Boltzmann distribution, a small number of low-energy collisions can result in adherence by conversion of the relative kinetic energy into rotational energy of the resulting dimer. Thus, a small fraction of dimers can form via 2-body collisions. At room temperature the dimer marriage is short-lived however and the dimers dissociate again after a few additional intermolecular collisions. At any instant the fraction of molecules in the dimer state is therefore small compared to the number of molecules in the monomer (=single molecule) state. However as the gas temperature is dropped, the fraction of low-energy collisions increases, and dimers live longer before they disassociate. At sufficiently low temperatures dimers are prevalent over monomers. In super-sonic self-cooling free jets as used in CRISLA and SILEX, cold dimers form and exist long enough to remain intact through-out the sub-millisecond long travel time from nozzle exit to skimmer entrance.

However, vibrationally laser-excited molecules are too energetic/hot to form dimers. Upon meeting a potential partner and trying to form a van der Waals dimer bond, such excited molecules release their vibrational energy in sub-microsecond timeframes. This energy is converted into kinetic energy that prevents the molecules from dimerizing and forces the molecules to recoil apart. Thus, isotope-selectively laser-excited molecules are prevented from forming dimers and tend to flee/escape the core of the free jet, thereby entering the rim or background stream in the evacuation chamber. Conversely, non-excited molecular species tend to form heavy dimers and tend to remain in the core of the jet, which is captured by a jet skimmer that pumps out the jet's core gas separately from the chamber background or the jet's rim gases.

It is advantageous to have the mass of the dimer partner molecules close to that of the isotopomer to be separated. For example for $UF_6$/G gas mixtures, the closer the mass of the dimer-forming collision partner G is to the mass of $UF_6$, the more kinetic energy a previously excited $UF_6$ monomer acquires in de-exciting and recoiling from G, as occurs after an attempted dimerization event between $UF_6$ and G. Due to these de-exciting and recoiling events the desired isotopomer of $UF_6$, in addition to being generally lighter and faster than dimerized $UF_6$:G, gains extra kinetic energy that helps it escape the jet core. Since super-cooling of $UF_6$ molecules must take place in excess carrier gas to keep $UF_6$ gaseous, a suitable dimer partner G would be inert xenon (Xe), which is the heaviest stable monatomic gas with the highest expansion coefficient $\gamma=1.66$, which contributes to quick adiabatic supersonic cooling, and cannot absorb vibrational infrared radiation. Relatively heavy and inert $SF_6$ (with $\gamma=1.3$) is another possible choice, but care must be taken that it does not scavenge some of the infrared laser radiation intended to excite only $UF_6$. The intermolecular van-der-Waals bond strength between $UF_6$ and (expensive) Xe is also different from that between $UF_6$ and (less expensive) $SF_6$, but either of these or other suitable heavy partner gas can be utilized.

Cooling of a gaseous $UF_6$ feed stream in an MLIS process is generally desirable because the fundamental (strongest) vibrational $v_3$ absorption bands in the 16-micron wavelength region for heavy $^{235}UF_6$ and $^{238}UF_6$ molecules overlap considerably at room temperature. Although the Q-peak of the fundamental $v_3$ vibration of $^{238}UF_6$ around 627.7 cm$^{-1}$ is isotope-shifted by 0.6 cm$^{-1}$ to 628.3 cm$^{-1}$ for $^{235}UF_6$, at room temperature (~300 K), the P- and R-branch-broadened isotopic absorption bands overlap each other considerably. Only at lower temperatures do the spectral bands of $^{235}UF_6$ and $^{238}UF_6$ shrink and separate, allowing better selective laser excitation.

Unfortunately, the vapor pressure of $UF_6$ at 243 K is only 1 Torr, and at lower temperatures it condenses into a solid. The solution is to laser-irradiate a mixture of gaseous $UF_6$ diluted with a volatile carrier gas (G) in an adiabatically self-cooled supersonic jet, wherein the super-cooled $UF_6$ molecules can remain gaseous during jet expansion. In this technique, one passes a $UF_6$/G gas mixture from a feed tank through a supersonic nozzle into an evacuated low-pressure chamber where it forms a supersonic supercooled jet. This approach allows the $UF_6$ to cool down, as a dispersed gas, to very low temperatures (below 100 K) for a very brief period (milliseconds) as it travels through the chamber, before it is captured by a jet core "skimmer" which acts as a diffuser that takes the supersonic gas stream back to subsonic flow and ambient temperatures. Besides pressure recovery and a return to subsonic flow, the skimmer also separates the expanded gas into two separated streams in which the relative $^{235}UF_6$ and $^{238}UF_6$ concentrations are different. This approach was used in MOLIS research, but problems arose when the supersonic gas mix was super-cooled too much, and $UF_6$ started to dimerize to $UF_6$:G and formed particles in the downstream jet. Instead of fighting dimerization, it was then conceived to take advantage of the dimer formation phenomenon, resulting in the present CREMLIS-based CRISLA process.

In summary, of the MLIS harvesting techniques, MOLIS and CHEMLIS have proven to be commercially unattractive because of smaller-than-expected separation factors and inter-stage chemical reprocessing requirements. CRISLA and SILEX have been found acceptable, primarily because no inter-stage reprocessing is needed, and single-stage enrichment factors of $\beta \geq 2$ are achievable, making these processes competitive with centrifuge enrichment. Using CRISLA, only three or four stages of enrichment are required to enrich natural uranium from 0.7% U-235 to 5% U-235, compared to the ten or more stages required in centrifuge separation techniques. Retrieval of $UF_6$ in the product and tails streams of $UF_6$/G mixtures, where G is a more volatile gas, can be achieved by simple cryo-trapping of $UF_6$ in cold-traps as is well-known to those familiar with the art.

In a recently publicized SILEX uranium enrichment pilot program, pulsed 16-micron lasers were used to excite $^{238}UF_6$ and $^{235}UF_6$ molecules in a supersonic jet as described above. These 16-micron lasers were originally developed for MOLIS and CHEMLIS research programs in the 1970-1990 period, and comprise a pulsed high-power 10-micron $CO_2$ laser and a liquid-nitrogen-cooled para-hydrogen-filled raman conversion cell that converts the 10-micron laser lines from a pulsed $CO_2$ TEA laser to 16-micron laser lines. Except for this $H_2$-raman-converting $CO_2$ laser, an extensive three-decades-long worldwide search (see Eerkens, J., editor; "Laser Isotope Separation—Science and Technology", Vol. MS 113, SPIE Optical Engineering Press) failed to find another suitable pulsed or continuous 16-micron laser that could produce fine-tuned laser frequencies at high laser power levels with adequate overlap of the Q-Branch absorption peaks of cold gaseous $UF_6$. The most advanced of the pulsed 16-micron raman-converted $CO_2$ laser systems was developed in South-Africa (SA), which has been adopted by the industrialized SILEX pilot program.

One problem that has been encountered with the SA 16-micron lasers is that the maximum pulse repetition rate (prr) of the driver $CO_2$ TEA laser is limited to 500-1000 Hz at the desired operating wavelengths while approximately 10,000 Hz is desired, as reported in the literature. Because the 16-micron-laser-irradiated $UF_6$/G gas mixture passes through the irradiation chambers at supersonic speeds in 50-100 microseconds, and because laser pulses last about 0.1 microseconds, there will be long dead-times (no laser-irradiation) between pulses for periods of 1000 microseconds if the pulse repetition rate equals only 1000 Hz. The average laser-irradiation duty factor is then only 10% unless the prr can be raised. This problem may be partly solved by pulsing feed gas flows to coincide with laser irradiation periods. Alternatively one could laser-irradiate the process gas with ten separate 1000 Hz lasers whose outputs are time-multiplexed. Such measures would, however, increase the system's complexity and process costs considerably.

Another problem with the $H_2$-raman-conversion $CO_2$ laser is that laser spectral frequencies require additional super-fine microwave-shifted tuning to optimize absorptions by $^{235}UF_6$ or $^{238}UF_6$. Together with inadequate 1000 Hz pulse repetition rates and the inherently low (~0.2%) electricity-to-laser energy conversion efficiencies of raman-converted 16-micron $CO_2$ lasers, these problems have made the SILEX process with fine-tuned pulsed $CO_2$ lasers more expensive than centrifuge enrichment of $UF_6$. In addition there are 16-micron-laser losses due to Dicke super-radiance from intense short laser excitation pulses that reduce the laser efficiency even more.

It is thus a first object of the present application to present an advanced CRISLA process and system that is less expensive and less complex than presently known SILEX and CREMLIS processes.

It is a further object of the present application to present an advanced CRISLA process and system that allows for high percentage enrichment of a selected isotopomer species within a single separation step.

It is a further object of the present application to present an advanced CRISLA process and system that employs a novel laser excitation methodology that prevents dimerization of a desired isotopomer, and promotes its expulsion from a free jet thereby separating the desired isotopomer from a mixture of isotopomers.

It is a further object of the present application to present an advanced CRISLA process and system that employs a simple, efficient, inexpensive, and robust CO laser, instead of an inefficient and expensive $CO_2$ laser and raman conversion cell.

It is a further object of the present application to present an advanced CRISLA process and system that employs intracavity laser excitations of target molecules with a minimum of optical windows and high bidirectional laser power flux.

It is a final object of the present application to present an advanced CRISLA process and system that may be designed and operated in massively serial or parallel configurations with only a single CO laser.

SUMMARY OF THE INVENTION

The present application discloses an advanced CRISLA system using a 5-micron laser and multi jet intra-cavity irradiations.

The advanced improved CRISLA process as disclosed herein employs free-jet super-cooling of $UF_6$/G gas mixtures and condensation repression of $UF_6$:G dimers, similar to what is utilized in earlier CRISLA processes. Instead of using a currently customary pulsed 16-micron laser, a continuous CO laser is used which has strong laser output lines in the 5-micron wavelength region. As experimentally proven, these lines excite some Q-branches of the $3v_3$ vibrational overtone hot bands of $UF_6$ and may be utilized instead of employing laser lines that excite the fundamental Q-branches of the $v_3$-band around 16 microns.

The main reason this scheme was not pursued in the past was that the absorption cross-section for $3v_3$ excitations of $UF_6$ near 5 microns is approximate 5,000 times weaker than for $v_3$ excitations around 16 microns. However, aside from that difficulty, most difficulties encountered with $UF_6$ excitations around 16 microns are absent for excitations around 5 microns. In the advanced CRISLA process, the low absorption cross-section at 5 micron has been overcome by implementing a combination of (1) intra-cavity laser energy extraction, (2) use of ultra-high reflection (near 100%) laser resonator end mirrors, (3) laser beam passage through a hundred or more adjacent mini jets for efficient laser energy usage, and (4) implementation of nearly non-divergent intra-cavity laser beam profiles such as Bessel waves to minimize intra-cavity diffraction losses. The fact that electricity-to-laser energy conversion efficiencies of strong single-line 5-micron CO lasers are much higher (~5%) than for raman-converted single-line 16-micron $CO_2$ lasers (~0.2%), makes the advanced CRISLA system's laser enrichment scheme highly competitive with current centrifuge and 16-micron uranium laser enrichment systems.

For optimum $UF_6$ absorptions near 5 microns, it has been found that it is best to jet-cool to temperatures where the first four hot bands of the $3v_3$ vibration of $UF_6$ are active. To achieve this, the free supersonic jet must cool down to less than 150 K. Note that this T<150 K requirement is generally higher than, and easier to achieve than, the optimum temperatures T<60 K required for selective 16-micron excitations of $UF_6$. To obtain optimum downstream temperatures for isotope separation, the starting temperature (and pressure) in the gas mix tank feeding the nozzle that supplies the free jet gas to the expansion chamber (see FIG. 2) is preferably below room temperature. Feed tank total pressures are generally between 100 and 1000 Torr, while the feed tank temperature is typically between 250 and 300 K, although lower or higher pressures and temperatures may be used in certain cases. Commercially available feed nozzles providing gas exit flow velocities between Mach-1.5 and Mach-2 may be used, although lower or higher Mach numbered (custom-designed) nozzles or open orifices between feed and processing chambers may be employed in certain applications. Besides supersonic nozzles or orifices, extension skirts may be added to them (see FIG. 1) to guide the expanding supersonic free jet into a favorable plume for optimum jet skimming and laser enrichment. Well-known supersonic jet relations between upstream (prior to the nozzle) and downstream temperatures, pressures, densities, and flow velocities (in and past the nozzle) may be used to estimate the best set of parameters to provide optimum temperatures in the laser irradiation region of the jet for optimum separation. While FIG. 2 illustrates coaxial jet irradiation used in exploratory tests, in commercial applications the laser beam will irradiate a number of mini jets cross-wise as shown in FIGS. 3b and 3c.

The presently disclosed advanced CRISLA system employs a combination of favorable operating factors and the arrangement of a multitude of separator units irradiated by one CO laser, allowing laser enrichments of $UF_6$ with the improved CRISLA technique to be accomplished with less than 10% of the electric energy consumption used in 16-micron laser enrichment systems for the same yield. As mentioned, use of the 5-micron CO laser instead of the 16-micron laser was considered briefly in previous MLIS research, but was rejected by most researchers because of the 5000 times weaker photon absorption cross-section of $UF_6$ at 5 microns compared to that at 16 microns. With the currently disclosed combination of improved process operational parameters and simpler equipment components, the low-absorption problem with 5-micron operations has been overcome and difficulties encountered with complex pulsed 16-micron laser systems are avoided.

To better understand the above-described techniques for overcoming low absorption cross-sections, note that the laser excitation rate $k_L$, of $UF_6$ molecules or any other molecule is given by the product of the laser flux ($\varphi_L$, (photons per cm$^2$ per sec) and the absorption cross-section $\sigma_a$ (cm$^2$):

$$k_L = \varphi_L \times \sigma_a \text{ per sec per molecule} \quad (1)$$

Clearly it is desirable to make both $\varphi_L$ and $\sigma_a$ as high as possible in order to achieve high isotope excitations and separations at economic production rates.

In (1), $\sigma_a$ is the nature-fixed wavelength-dependent absorption cross-section which depends on fixed molecular characteristics of $UF_6$, and whose rotationally broadened spectral PQR profile only sharpens towards lower temperatures. Typically, the Q branch increases by as much as a hundred-fold while P and R side-branches shrink as the gas temperature drops causing more $UF_6$ molecules to absorb in the Q-branch. It is the main reason for cooling the $UF_6$ gas so that the sharp laser line frequency can overlap the Q-peak frequency and most $UF_6$ molecules can be laser-excited. While one can maximize $\sigma_a$ only some hundred-fold by gas-cooling and laser-line matching, the only possibility to increase $k_L$ further is to increase $\sigma_L$. In the new advanced CRISLA process, such maximization of $\sigma_L$ is achieved by placing the $UF_6$/G jets internal to the laser resonator cavity, and insuring that the resonator end-mirrors, comprising a total mirror and a laser-line-frequency selecting grating, have the highest possible reflectivities (R) in the near-infrared at 5 microns. Cooled polished copper total mirrors with R=99.7% are commercially available, while ruled copper gratings that are cooled can be purchased with R=98% or better. The internal photon flux of a resonator cavity with such end mirrors may attain a bi-directional intensity of more than 10 kW/cm$^2$ while circulating back and forth in the resonator as a continuous confined standing-wave held between properly focused large-radius end mirrors.

Because photon losses per pass through a gaseous low-pressure $UF_6$ jet are very low, it is possible to pass one high-power intra-cavity 5-micron laser beam through hundreds of jet separator units to maximize laser energy usage. But in order to do this, the intra-cavity laser beam must be kept free from interference by any structures. This is partly accomplished by allowing an internal bi-directional multi-jet-crossing laser beam to traverse only process gas (no windows) as shown in FIGS. 3a, 3b and 3c, and by promoting a low- or non-diverging intra-cavity laser beam (e.g. Bessel-waves) via appropriate (annular) large-radius end mirror designs. For a raman-converting 16-micron $CO_2$ laser, it is not possible to circulate/recycle laser photons between resonator end-mirrors because of the intervening raman conversion cell, but for the 5-micron continuous CO laser disclosed herein this is achievable.

The presently disclosed advanced CRISLA system offers advantages of simplicity, lower cost, and ruggedness as compared to a 16-micron laser enrichment system. As shown in FIG. 1, the 5-micron laser irradiation system used in CRISLA comprises a single hardware unit, while the 16-micron system employs a four-piece raman-converting $CO_2$ laser system which includes: (a) a pilot laser, (b) a pulsed amplifier laser, (c) a raman conversion cell, and (d) irradiation cell unit(s). With these multiple laser system sub-components, the 16-micron laser requires eight or more far-infrared 16-micron and 10-micron transmission optics, whereas the 5-micron laser requires only three mid-infrared transmitting windows.

In FIG. 1, a single co-axially aligned (experimental) jet irradiation chamber is shown for illustration, but in commercial applications, the preferred laser beam irradiation is perpendicular to jet flow with one laser beam crossing many jets as shown in FIGS. 3b and 3c. This multi-jet arrangement provides an increased peripheral jet-core escape surface for laser-excited monomers, thereby increasing enrichment factors compared to conventional slit-nozzle jets used heretofore.

While CW (continuous wave) CO laser operation in CRISLA can be adequate if excessive parasitic intra-cavity laser energy losses are avoided, in certain applications, internal 5-micron laser intensities can be enhanced ten-fold by pulsing. In pulsed lasing, laser energy is stored between pulses and released all at once during a short time resulting in higher peak fluxes. The 5-micron CO laser can be pulsed efficiently by Q-switching using a rotating laser end mirror as was tested in an earlier version of the CRISLA process. In CRISLA applications where pulsed CO lasing is desired, the process gas will also be pulsed in synchronization.

Regarding the specific wavelength(s) that the presently disclosed advanced CRISLA system employs, it has been found that two strong lines of a CO laser at 1876.30 cm$^{-1}$ ($P_8$-15) and at 1876.63 cm$^{-1}$ ($P_7$-21) coincide with Q-Branch peaks of the first four spectrally shifted low-energy hot bands (co-vibrations $v_h = v_6$, $v_4$, $v_5$, or $2v_6$) of the $^{235}UF_6$ ($3v_3$) vibrational excitation. Also, a laser line at 1874.45 cm$^{-1}$ ($P_9$-9) overlaps the $2v_6$-hot-band-shifted $^{238}UF_6(3v_3)$ resonance. These lasing lines have been labeled k1, k2, and k3 for short. With the grating-tuned CO laser running on the k1 and k2 lines, unequivocal moderate enrichments of $^{235}UF_6$ were measured several times in non-optimum past explorations.

The symbols ($P_a$-b) in the above are standard designations used in the scientific literature for laser emissions in the P-Branch of the CO molecule in transitions between upper vibrational level v"=a+1 to lower level v'=a, accompanied by original rotational state J=b to rotational state J=b+1. Should there be a frequency mismatch between a $UF_6(3v_3)$ Q-branch absorption and a natural $^{12}C^{16}O$ laser line, one may consider utilizing other isotopic $^iC^jO$ molecules with C-13, O-17, or O-18 isotopes replacing C-12 and O-16. The laser emission lines of such isotopic $^iC^jO$ lasers are generally red-shifted from the natural $^{12}C^{16}O$ laser lines. In addition, techniques exist to shift and fine-tune laser emission frequencies slightly by means such as microwave frequency super-position, imposing electric or magnetic fields, vibrating/oscillating laser resonator mirrors, or non-linear optical interferences. Such slightly adjusted laser frequencies can be tuned to coincide with the Q-branch peaks of cold- or hot-band $3v_3$ absorptions by $^{232}UF_6$, $^{233}UF_6$, $^{234}UF_6$, $^{235}UF_6$, $^{236}UF_6$, or $^{238}UF_6$ molecules, which often can increase a desired absorption two- to ten-fold.

Besides reduced complexity, the improved 5-micron CRISLA laser process for $UF_6$-enrichment as disclosed herein, offers several additional advantages over currently utilized 16-micron $UF_6$ excitation techniques. Firstly, the isotope shift of $\Delta v_{is} \approx 1.8$ cm$^{-1}$ between $^{235}UF_6$ and $^{238}UF_6$ for the $3v_3$ band around 5.3 microns (1876 cm$^{-1}$), is three times larger than the isotope shift of $\Delta v_{is} \approx 0.6$ cm$^{-1}$ for the $v_3$ absorption band around 16 micron (625 cm$^{-1}$). This reduces isotopic band overlaps and allows much better selective isotope excitations.

Secondly, immunization against dimerization in a super-cooled supersonic jet lasts three times longer for 5-micron laser-excited $UF_6(3v_3)$ molecules than for 16-micron once-excited $UF_6(v_3)$ molecules. This is because excited $UF_6$ ($3v_3$) molecules require three VT collisions to lose all their excitation energy and thus take three times longer than once-excited $UF_6(v_3)$ molecules in loosing all their vibrational energy by VT energy transfer collisions in a gas. Excited $UF_6(v_3)$ molecules require only one VT collision to lose all their excitation energy.

Thirdly, a phenomenon observed in some earlier pulsed 16-micron laser enrichment research, is that in spherical domains with radii R≤100 microns, the near-instantly pumped-up groups of gaseous $UF_6^*(v_3)$ molecules excited by high-power 16-micron laser pulses relax rapidly from the $v_3$ excited level to the $v_2$ vibrational level of $UF_6$ via Dicke super-radiance (DSR). This occurs if the instantaneous population inversion between two vibrational levels is high, as happens when it is created nearly instantly by a sub-microsecond 16-micron laser pulse. Photonic relaxation via DSR is much faster than spontaneous Einstein emission of an excited vibrational state. The DSR effect can cause 16-micron-excited $UF_6^*(v_3)$ molecules to loose their excitation (and thus dimerization resistance) in microseconds during a jet flight if the $UF_6^*(v_3)$ density is high and the laser pulse is short enough. Of course de-excited $UF_6$ can be repeatedly re-excited during the jet flight, but this causes undesirable inefficiencies. For $UF_6^*(3v_3)$ molecules, which are continuously and gradually (not instantly) excited by a 5-micron CO-laser, strong inverted DSR-lasable populations as are produced by pulsed 16 micron lasers, are absent. DSR physics is discussed in more detail in Appendix B, "Molecular Quantum Changes and Dicke Superradiance (DSR)" of ITI/Prodev unpublished report PD-09-0511R, titled "Lifetimes, Populations, and Absorptions of the $v_3$ and $3v_3$ vibrations in $UF_6$".

Fourthly, the thermal radiation spectrum emitted by all solid (containment) materials at room temperature peaks at a wavelength around 16 microns. While not monochromatic or coherent like 16-micron laser photons, such 16-micron thermal background radiation can affect photon sensors and monitors. To avoid this, accurate 16-micron sensors require cryogenic cooling. Thermal radiation emitted by solid materials at room temperature at 5 microns is a hundred times weaker than that at 16 microns, and thus 5-micron laser photons can be monitored with room-temperature sensors.

Fifthly, in the future, for use in thorium breeder reactors, it will be desirable to separate $^{233}UF_6$ from $^{232}UF_{65}$ which differ by only one mass unit. It is believed that $v_3$ excitation with laser lines in the 16-micron region for absorption bands with an isotope shift of only 0.2 cm$^{-1}$ will overlap too much to produce adequate enrichments, even if jet-cooled. However for CO laser excitations of $3v_3$ in the 5.3 micron absorptive region, the isotope shift will be three-times larger (0.6 cm$^{-1}$) and laser separation of $^{233}UF_6$ from $^{232}UF_6$ appears possible. One of the lines in the strong CO-laser's "j-line" cluster at 1878.26 cm$^{-1}$ ($P_9$-8), 1880.34 cm$^{-1}$ ($P_8$-14), and 1880.90 cm$^{-1}$ ($P_7$-20) overlaps the cold and hot Q-bands of $^{232}UF_6(3v_3)$ to affect desired condensation repression. Besides separations of $^{233}UF_6$ from $^{232}UF_6$ in the thorium fuel cycle, cases may occur in the future where separations between $^{232}UF_6$, $^{233}UF_6$, $^{234}UF_6$, $^{235}UF_6$, $^{236}UF_6$, or $^{238}UF_6$ molecules are needed, which are more amenable with $\Delta v_{is}$=0.6 cm$^{-1}$ than with $\Delta v_{is}$=0.2 cm$^{-1}$.

Thus, in summary, the present application discloses an efficient advanced CRISLA process suitable for the enrichment of $UF_6$ isotopomers wherein the process and system is free of 16-micron Dicke super-radiance losses, utilizes intra-cavity single-laser irradiation of multiple super-cooled supersonic free mini jets of $UF_6$/G gas mixtures with a 5-micron line-tuned CO laser to selectively suppress dimerization and thereby affect separation of $^{235}UF_6$ or $^{238}UF_6$ isotopomers in the jet, and utilizing a downstream jet-core skimmer that separates the core gas from background rim gases, which when employed allows uranium enrichment to be achieved at lower cost than is obtainable with present laser enrichment techniques using pulsed 16 micron raman-conversion $CO_2$ lasers.

In a first embodiment of the disclosed process for enriching a selected isotope of uranium from a mixture of gaseous $UF_6$ isotopomers the process comprises the steps of: 1) providing a supersonic low-pressure flow chamber having an adiabatically expanded supersonic super-cooled gaseous free-jet, a high-pressure supersonic core region surrounded radially by a barrel shock and slower flowing low-pressure chamber-background rim gases, a gas feed input section, a photon excitation section downstream from the input section, a gas flow exit section, a super-cooling of the free jet gas in the flow chamber to enhance the spectral narrowing and separation of absorption bands of the selected uranium isotope in the mixture of $UF_6$ isotopomers; 2) selectively exciting the $UF_6$ isotopomers carrying the selected uranium isotope with photons so that the selected isotopomers are prevented from forming van der Waals dimers or condensation into clusters in the supersonic super-cooled jet; and 3) collecting the non-dimerized selectively excited isotopic monomers separately from the heavier van der Waals-dimerized or -clustered isotopomers formed in the super-cooled supersonic jet.

In a further embodiment of the process for enriching a selected isotope of uranium from a mixture of gaseous $UF_6$ isotopomers, the adiabatically expanded supersonic gaseous free jet comprises a mixture of carrier gases G and $UF_6$ in a predetermined $UF_6$/G molecular ratio, and the majority of dimers formed in the downstream super-cooled jet are van der Waals-bonded $UF_6$:G. dimers or clusters.

In a further embodiment of the process for enriching a selected isotope of uranium from a mixture of gaseous $UF_6$ isotopomers the selected uranium isotope is one of U-232, U-233, U-234, U-235, U-236, U-237, or U-238.

In a further embodiment of the process for enriching a selected isotope of uranium from a mixture of gaseous $UF_6$ isotopomers feed gas, the input section comprises a feed chamber with gas pressure at least twice the gas pressure in the flow chamber, which possesses one of a supersonic Laval nozzle or an open orifice that connects the feed chamber to the supersonic flow chamber.

In a further embodiment of the process for enriching a selected isotope of uranium from a mixture of gaseous $UF_6$ isotopomers, the gas feed input section includes a mixing tank connected to the feed chamber to mix carrier gases G and $UF_6$ prior to their entry into the feed chamber.

In a further embodiment of the process for enriching a selected isotope of uranium from a mixture of gaseous $UF_6$ isotopomers, the gas flow exit section comprises a skimmer that intercepts the supersonic jet's downstream core gases and moves those gases into a post-skimmer chamber separated from any background rim gases, the latter being pumped out separately and collected in a separate post-rim-flow chamber.

In a further embodiment of the process for enriching a selected isotope of uranium from a mixture of gaseous $UF_6$ isotopomers, the jet's core gas collected in the post-skimmer chamber returns to subsonic flow and ambient temperature conditions causing all former van der Waals-bonded dimers and clusters to dissociate and return to a $UF_6$+G gas mixture again without dimers or clusters.

In a further embodiment of the process for enriching a selected isotope of uranium from a mixture of gaseous $UF_6$ isotopomers, the carrier gas G is a heavy chemically inert gaseous molecule with a high gas coefficient $\gamma=Cp/Cv$.

In a further embodiment of the process for enriching a selected isotope of uranium from a mixture of gaseous $UF_6$ isotopomers, G is one of the gases Xe, Rn, $SF_6$, $Br_2$, $I_2$, $SiBr_4$, or other heavy chemically inert gaseous molecule.

In a further embodiment of the process for enriching a selected isotope of uranium from a mixture of gaseous $UF_6$ isotopomers, G is a mixture of two gases Y and Z, with Y being one of the gases He, Ar, or $N_2$, and Z being one of the group Xe, Rn, $Br_2$, $I_2$, $SF_6$, $SiBr_4$, or other heavy chemically-inert gaseous species, the optimum molecular ratio Y/Z being determined experimentally.

In a further embodiment of the process for enriching a selected isotope of uranium from a mixture of gaseous $UF_6$ isotopomers, the predetermined $UF_6$/G molecular ratio is between 1/100 and 1/5.

In a further embodiment of the process for enriching a selected isotope of uranium from a mixture of gaseous $UF_6$ isotopomers, photon excitation is carried out by selected emission lines from a 5-micron CO laser.

In a further embodiment of the process for enriching a selected isotope of uranium from a mixture of gaseous $UF_6$ isotopomers, the selected CO laser emission lines overlap the absorption lines of $3v_3$-excited vibrations of $UF_6$.

In a further embodiment of the process for enriching a selected isotope of uranium from a mixture of gaseous $UF_6$ isotopomers, the selected CO laser emission lines are the $P_8$-15 line at 1876.30 $cm^{-1}$ and the $P_7$-21 line at 1876.63 $cm^{-1}$ whose frequencies overlap the absorption lines of the $3v_3$ hot-band vibrations of $^{235}UF_6$ with hot co-vibrations $v_h=v_6$, $v_4$, $v_5$, and $2v_6$.

In a further embodiment of the process for enriching a selected isotope of uranium from a mixture of gaseous $UF_6$ isotopomers, the selected CO laser emission line is the $P_9$-9 line at 1874.45 $cm^{-1}$ whose frequency overlaps the absorption line of the $3v_3$ hot-band vibration of $^{238}UF_6$ with hot co-vibration $v_h=2v_6$.

In a further embodiment of the process for enriching a selected isotope of uranium from a mixture of gaseous $UF_6$ isotopomers, the selected laser emission lines are produced by a resonator mirror set comprising a cooled suitably-angled ruled diffraction grating and a cooled end mirror with substantially 100% reflectivities.

In a further embodiment of the process for enriching a selected isotope of uranium from a mixture of gaseous $UF_6$ isotopomers, laser excitation of the supersonic jet is achieved by placing the process gas excitation section and CO laser plasma section internal to the laser resonator mirror and grating, co-aligned with the intra-cavity laser beam.

In a further embodiment of the process for enriching a selected isotope of uranium from a mixture of gaseous $UF_6$ isotopomers, the 5-micron CO laser is a high-power continuous (CW) running CO laser.

In a further embodiment of the process for enriching a selected isotope of uranium from a mixture of gaseous $UF_6$ isotopomers, the 5-micron CO laser is a high-peak-power pulsed CO laser and the gas feed input section defined in claim 1 is supplied in pulses synchronized with the CO laser pulses.

In a further embodiment of the process for enriching a selected isotope of uranium from a mixture of gaseous $UF_6$ isotopomers, the intra-cavity bi-directional laser power density equals or exceeds 10 kW per $cm^2$ for a single grating-selected laser line.

In a further embodiment of the process for enriching a selected isotope of uranium from a mixture of gaseous $UF_6$ isotopomers, the line-selective high-reflection grating is substituted with one of a total (99.8%+) reflector in combination with a high-transmission high-resolution laser-line frequency filter, or with a high-transmission wave-plate laser-line frequency selector.

In a further embodiment of the process for enriching a selected isotope of uranium from a mixture of gaseous $UF_6$ isotopomers, the intra-cavity laser beam diameter is between 1 mm and 15 mm and remains substantially non-diverging over a distance of 5 meters as a Bessel-wave-shaped or similar profile using one of a large-radius total mirror and grating, and an annular total mirror and grating that terminate the gas-filled laser resonator cavity.

In a further embodiment of the process for enriching a selected isotope of uranium from a mixture of gaseous $UF_6$ isotopomers, a means for ultra-fine frequency tuning of the laser lines is provided so as to shift the laser line frequencies to coincide with the peak Q-branch absorptions of the selected $UF_6$ isotopomer.

In a further embodiment of the process for enriching a selected isotope of uranium from a mixture of gaseous $UF_6$ isotopomers, the ultra-fine frequency shifting means is provided by one or more of microwave mixing, resonator mirror oscillation, electric- or magnetic-field-imposed frequency shifting techniques, or laser-beam passage through a non-linear optically transmitting medium.

In a further embodiment of the process for enriching a selected isotope of uranium from a mixture of gaseous $UF_6$ isotopomers, the process gas excitation section comprises a series of multiple aligned gaseous mini jet separators.

In a further embodiment of the process for enriching a selected isotope of uranium from a mixture of gaseous $UF_6$ isotopomers, the series of multiple aligned gaseous mini jet separators are irradiated by one laser beam passing crosswise through the multiple jets produced by the closely spaced mini-separator units.

In a further embodiment of the process for enriching a selected isotope of uranium from a mixture of gaseous $UF_6$ isotopomers, the series of multiple aligned gaseous mini jet separators are irradiated by one laser beam passing co-axially through all jets, nozzles, skimmers, and gas flow plenums of all mini-separators.

In a further embodiment of the process for enriching a selected isotope of uranium from a mixture of gaseous $UF_6$ isotopomers, the separately collected core and rim gases are pumped through separate cold-traps to separately remove the depleted and enriched $UF_6$ fractions from the carrier gas G in the gaseous $UF_6$/G mixtures by $UF_6$ condensation on cold-trap walls.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein.

FIG. 1 shows the major hardware components of the simpler 5-micron CO-laser-driven advanced CRISLA process in comparison with those of a more complex pulsed 16-micron Raman-converted $CO_2$ laser system;

FIG. 4 shows calculated curves of obtainable uranium isotope enrichment factors as a function of downstream jet temperature, pressure, $UF_6$/G concentration, and the effect of the atomic mass of G;

FIG. 5a shows a high-resolution spectrum of the overlap of several strong CO laser lines with a computer-calculated spectrum of the cold- and hot-band $3v_3$ vibrations of $^{238}UF_6$ and $^{235}UF_6$ at a super-cooled temperature of 200 K between 1874 and 1878 $cm^{-1}$;

FIG. 6a shows an ultra-high-resolution laser-diode-measured absorption spectrum of the $3v_3$ vibration of natural $UF_6$ at T=257 K in the hot-bands region between 1874.4 and 1874.9 $cm^{-1}$ where three strong CO laser lines reside; and FIG. 6b shows an ultra-high-resolution laser-diode-measured absorption spectrum of the $v_3$ and $3v_3$ vibration of natural $UF_6$ at T=257 K in the cold-band regions between 627.600 and 627.705 $cm^{-1}$ and between 1875.386 and 1875.600 $cm^{-1}$ respectively.

DETAILED DESCRIPTION OF THE INVENTION

Figure 3A:
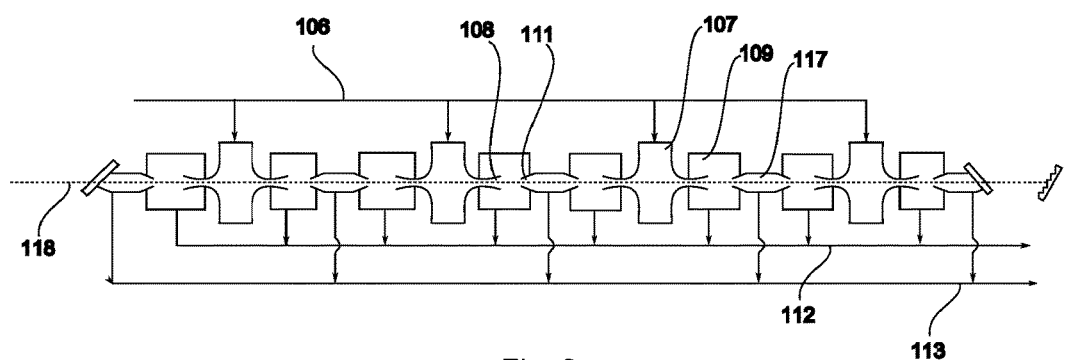
FIG. 3A shows the co-axial laser irradiation of a series of mini jets using one CO laser and a block of multiply adjoined nozzles, skimmers, and rim-gas pump-out plenums for $UF_6$/G gas feed, tails, and product flows, producing isotopically depleted and enriched $UF_6$ gas streams.
Figure 3B:
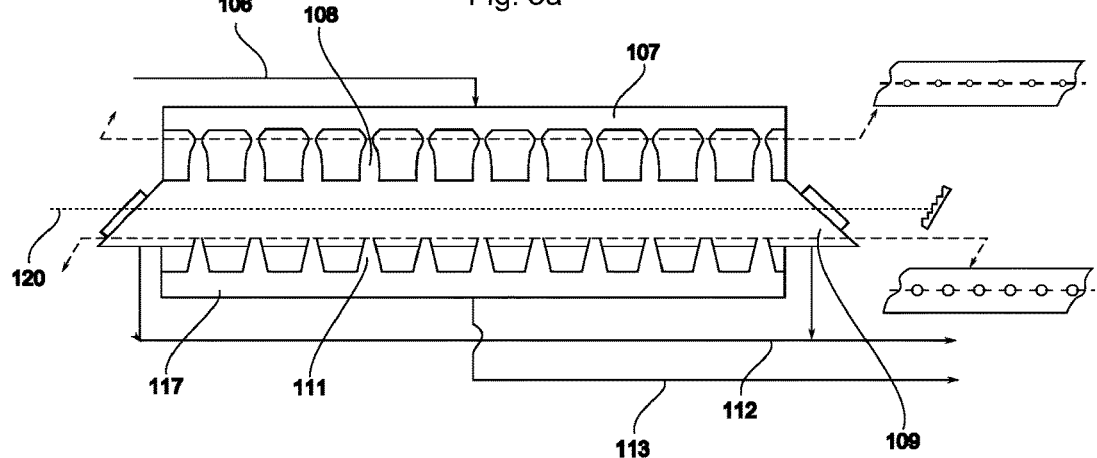
FIG. 3B shows the cross-flow laser irradiation of a series of mini jets fed by a common $UF_6$/G feed chamber and using a single CO laser beam inside a cell with many adjacent nozzles and skimmers, from which the rim-gas is pumped out to a common product chamber and the skimmer-captured gasses are collected by a common separate tails chamber, yielding tails, and product streams of separated isotopically depleted and enriched $UF_6$.
Figure 3C:
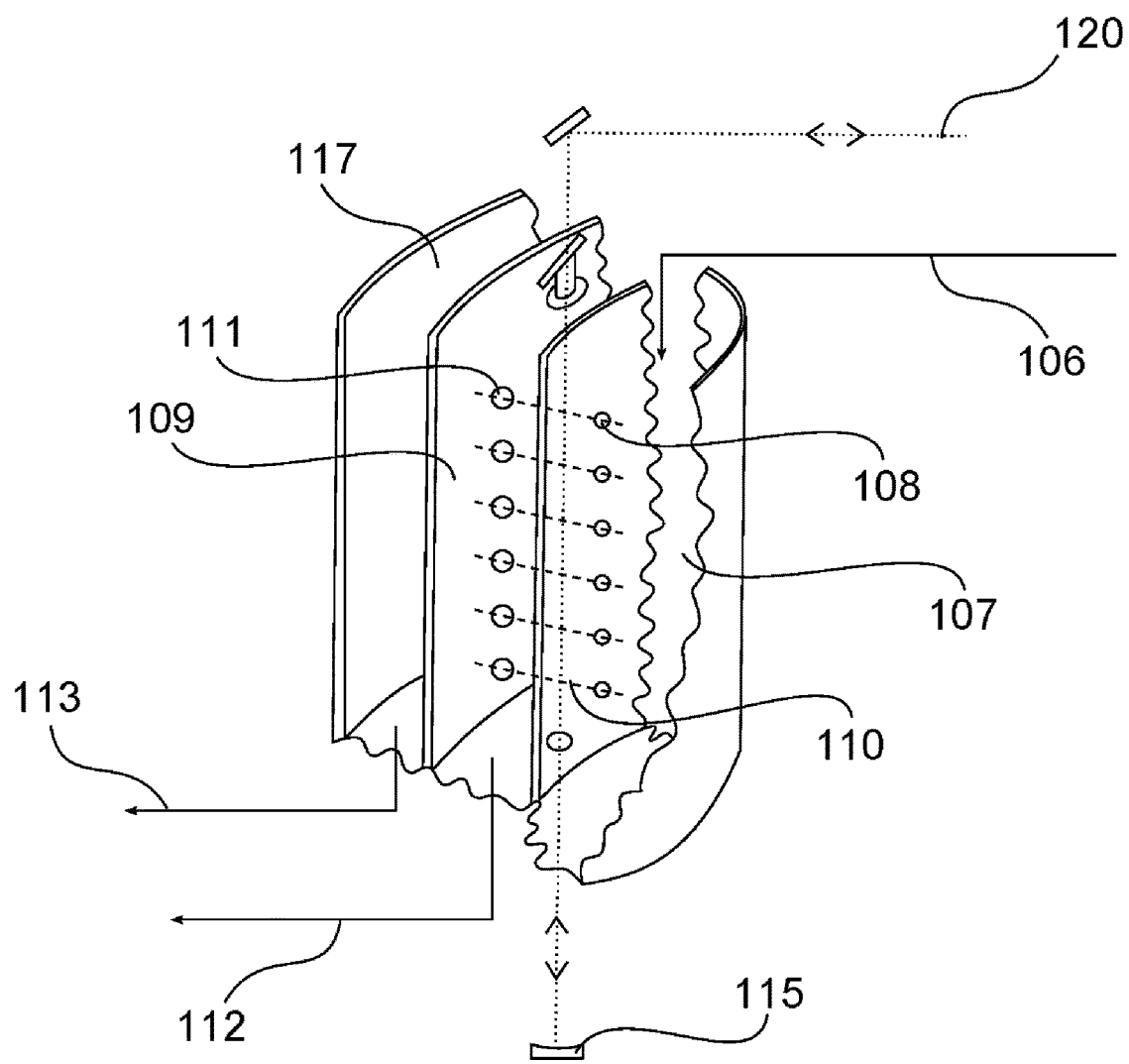
FIG. 3C shows a cross-irradiated preferred arrangement of minijet nozzles and skimmers in a compact nested set of cylindrical chambers comprising a feed chamber, an irradiation chamber, and a skimmer chamber.

Turning first to FIG. 1, a 5-micron CW laser-driven CRISLA system 100 schematic is compared with that of a 16-micron pulsed laser uranium enrichment scheme 200. The complexity of providing pulsed 16-micron laser irradiation to the jet process chamber compared to continuous 5-micron laser delivery is immediately apparent. For simplicity, in FIG. 1 only a single irradiation process cell is shown, but in preferred embodiments of the advanced CRISLA system the system may comprise many (for example, one hundred) adjacent irradiated intra-cavity mini jets as shown in FIGS. 3a, 3b, and 3c. In the 16-micron case the incoming laser beam that enters the irradiation cell can be split and used to irradiate a number of production cells, but only uni-directionally; not as in the 5-micron CRISLA system, which can support a bi-directional intra-cavity recycling laser beam. Note that in FIG. 1 laser beam paths are shown with dashed lines.

As may be seen in FIG. 1, the advanced CW 5-micron CRISLA system offers significant advantages in terms of simplicity and inexpensiveness relative to pulsed 16-micron systems. The advanced CRISLA system 100 comprises two primary hardware components: the continuous CO laser 101 and the intracavity process chamber 102, while a typical pulsed 16-micron system comprises five or more separate hardware components: as shown in 200, three lasers (a CW pilot $CO_2$ laser 201, a pulsed TEA $CO_2$ laser oscillator 202, and a pulsed TEA $CO_2$ laser amplifier 203), one raman conversion cell 204, and one or more irradiation chambers 205. In addition, the 16-micron laser system requires (costly) liquid hydrogen (LH2 @ 20 K) coolant for its raman-cell, while the 5-micron CO laser requires (less expensive) liquid nitrogen (LN2 @ 77 K) cooling. Both systems comprise gas flow and mirror alignment control electronics, but the control electronics required for pulsed 16-micron systems are much more complicated than those for 5-micron systems.

Figure 2:
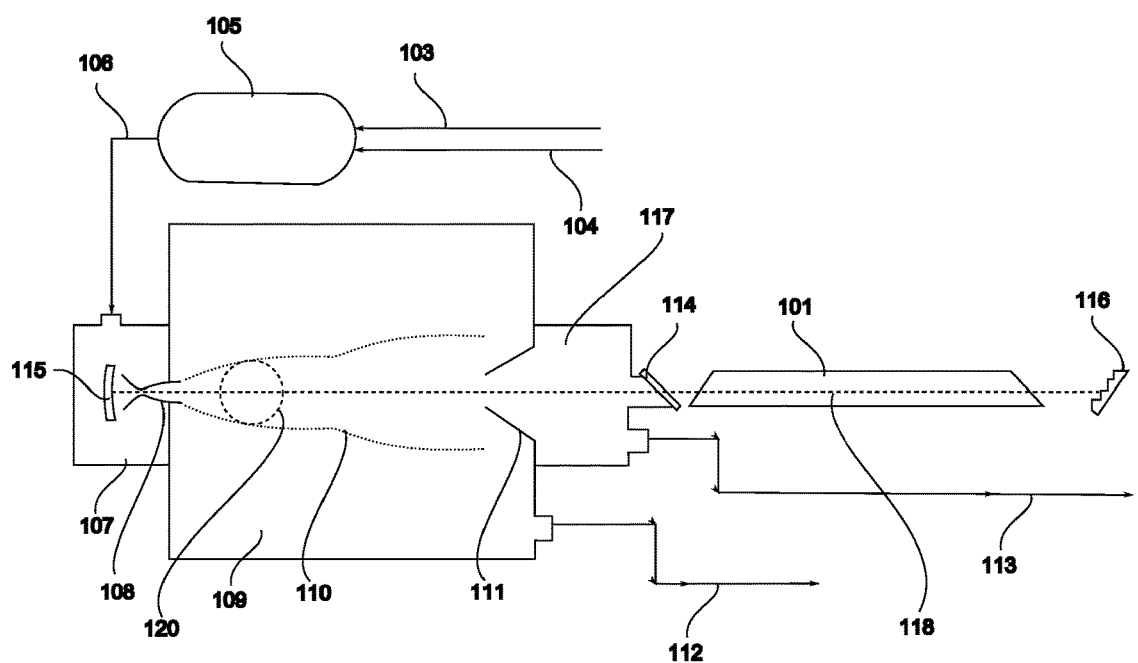
FIG. 2 shows the operation of a single $UF_6$ laser enrichment separator unit employing a gaseous supersonic super-cooling free jet of a $UF_6$/G gas mixture (G=carrier gas), which expands from a high-pressure feed tank through a nozzle into a constantly pumped-down low-pressure chamber, and whose gaseous jet core is axially or perpendicularly irradiated by a CO laser beam. Downstream, the core of the jet is separated from the chamber background gases by a skimmer, beyond which the core gas returns to subsonic flow and ambient condition.

Turning to FIG. 2, a schematic overview of the advanced CRISLA process is shown. FIG. 2 illustrates the basic process steps involved in a single laser-irradiated CRISLA isotope separator unit. Starting at the upper left of FIG. 2, $UF_6$ 103 and the carrier gas G 104 are introduced into a mixing tank 105, and thence pass as a $UF_6$/G mixture 106 to a feed tank 107. Upon exiting the feed tank the $UF_6$/G mixture expands after passing through a supersonic nozzle 108 into an evacuated low-pressure process chamber 109 where the gas flow develops into a supersonic super-cooling jet 110 (note that the jet is shown here by dotted lines). This jet generates $UF_6$:G dimers downstream from the nozzle, after the jet reaches a temperature below about 100 K. The jet is irradiated either with co-axial laser beam 118 or cross-axially by laser beam 120 with isotope-selective photons from a 5-micron laser, in this case CO laser 101 (note that the coaxial laser beam is shown here by a dashed line 118). Upstream absorption of these isotope-selective photons by $UF_6$ isotopomers prevents laser-excited isotopic $^iUF_6^*$ monomer molecules from forming dimers downstream where the gas temperature drops below 100 K. The excited non-dimerizable $^iUF_6^*$ monomer molecules tend to escape from the core of the jet after they experience a vibration-to-translation energy conversion in an encounter and a brief sub-nanosecond association with a potential dimer partner G. At the same time, the non-excited isotopomers of $UF_6$ form much heavier $UF_6$:G dimers that tend to remain in the jet core. In preferred cross-wise irradiations, most $^iUF_6$ molecules are laser-excited in the laser beam just after they leave the nozzle exit in the 100<T<170K temperature zone, before they enter the down-stream (T<100K) dimerization zone. The particular embodiment of the advanced CRISLA process shown in FIG. 2 also includes a $CaF_2$ Brewster windows 114, a laser end mirror 115 and a laser line grating 116.

A jet skimmer 111 separates the core of the supersonic gaseous jet from the chamber background or rim gases. This chamber 109, which processes these rim gases will be referred to as the irradiation or product chamber. The skimmer's inlet diameter is usually somewhat larger than the nozzle or orifice outlet diameter and collects the majority of non-excited dimerized $^iUF_6$:G species in the jet core in the tails chamber 117. Because the flow is supersonic, there are no back-propagation effects from the skimmer onto the jet. As the jet's core gas enters the skimmer mouth, it will go through a standing shock wave in the mouth of the skimmer beyond which the flow returns to subsonic flow and ambient conditions. Following their sub-millisecond supersonic flight as $^JUF_6$:G dimers in the jet chamber, the $^JUF_6$:G dimers in the gas mix will dissociate again to $^JUF_6$ and G monomers, after passing the skimmer entrance. Both rim gases 112 and core gases 113 are continuously pumped out separately to product and tails reservoirs (respectively) for further stage processing or final retrieval. In the retrieval compartments, enriched or depleted $UF_6$ is separated from carrier gas G via well-known standard cold-trapping methods.

Turning to FIGS. 3a, 3b, and 3c, multi jet embodiments of the advanced CRISLA system are shown. As may be seen these embodiments comprise sets of adjacent multiple mini-jets traversed co-axially or cross-wise by one laser beam shown as a dotted line 118 in FIGS. 3a, 3b, and 3c. In the coaxial arrangement shown in FIG. 3a, the laser beam crosses all portions of the process gas, including the low-pressure low-temperature dimerization region of the jet as well as the stagnant feed chamber regions, which are at higher pressures and temperatures. Since non-dimerizable laser-excited $^iUF_6^*$ monomers diffuse radially out of the jet core during their supersonic jet flight (promoting enrichment), and because they are radially distributed in the jet, a maximum number of them can be laser-energized with a co-axial irradiation arrangement FIG. 3a. In this arrangement, most of the total population of laser-excited $^iUF_6^*$ will loose their energy by VT relaxations in the higher-pressure feed-tank and nozzle before they escape from the jet core in the low-pressure process chamber. However because of the low $UF_6$ laser photon absorption cross-section at 5 microns, this loss is tolerable since less than 0.1% of the laser photons are lost per pass through each mini-separator unit. However, unless means can be found to avoid excessive diffraction losses as the intracavity beam passes through the small nozzle throats, the coaxial arrangement shown in FIG. 3a may be impractical and the cross flow arrangements of FIGS. 3b and 3c are preferred.

The preferred cross-beam laser irradiation arrangements depicted in FIGS. 3b and 3c have the advantage that adjacent mini jets may be put much closer to each other (e.g. drilled out of one block as shown in FIG. 3b) than is possible for the axial irradiation case of FIG. 3a. For large-scale commercial enrichments, the arrangement shown in FIGS. 3b and 3c are much preferred. While FIG. 3b shows a general cross-sectional view of the cross-beam arrangement, FIG. 3c shows a concentric arrangement of a cylindrical feed chamber, irradiation chamber, and tails chamber that allows multiple gas mini jets to expand from the denser inner feed chamber 107 through an annular irradiation chamber 109 towards the more voluminous low-pressure outer cylindrical annular tails chamber 117. Various components are labeled as described earlier with respect to FIG. 2.

FIG. 4 shows a plot of enrichment factors as a function of downstream jet temperature, and atomic weight of the carrier gas G, the major dimer partner in the $UF_6$/G mix. This plot was calculated from analytical relations as described in the CRISLA public literature. The plot clearly shows that the heavier the dimer partner G, the higher the isotope separation. While jet-cooling of pure $UF_6$ gas with atomic mass M=352 amu might appear attractive, VV transfers, premature $UF_6$ freeze-outs, and slow adiabatic jet expansions with $\gamma=1.06$, make the co-mixed carrier gas G preferable. A $UF_6$/G mix with excess carrier gas G also prevents excessive VV exchange losses between $^{235}UF_6$ and $^{238}UF_6$, and favors adequate jet-cooling of $UF_6$ for optimum selective spectral absorptions and avoidance of premature cluster formation of $UF_6$ ("snowing"). The inert carrier gas G should have a high gas constant $\gamma(=Cp/Cv)$ to provide sufficient supersonic cooling. The heavy monatomic gas Xe with $\gamma=1.66$ and the fairly inert heavy gas $SF_6$ with $\gamma=1.30$ are suitable. These carrier gases, G, yield high peak enrichment factors according to FIG. 4 for 1/50 mixtures of $UF_6$/G. Experimental testing may be used to determine optimum values for $UF_6$/G ratios and selection of the best carrier gas G. Additionally, some embodiments of the advanced CRISLA system may employ a three-component $UF_6$/Y/Z gas mixture generating heavier $UF_6$:Z dimers (e.g. Z=$SiBr_4$).

Figure 5B:
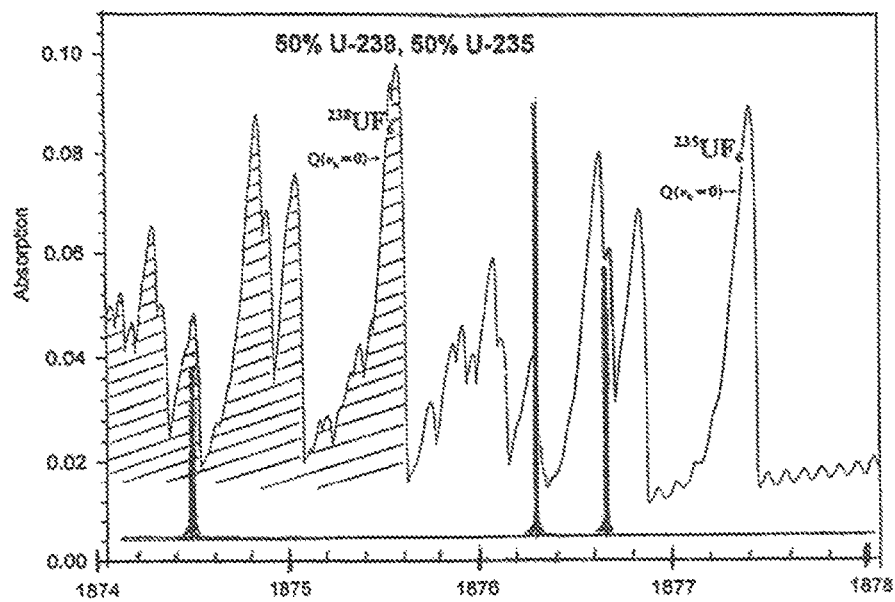
FIG. 5b shows a high-resolution spectrum of the overlap of several strong CO laser lines with a computer-calculated spectrum of the cold- and hot-band $3v_3$ vibrations of $^{238}UF_6$ and $^{235}UF_6$ at a super-cooled temperature of 150 K between 1874 and 1878 $cm^{-1}$.
Figure 5C:
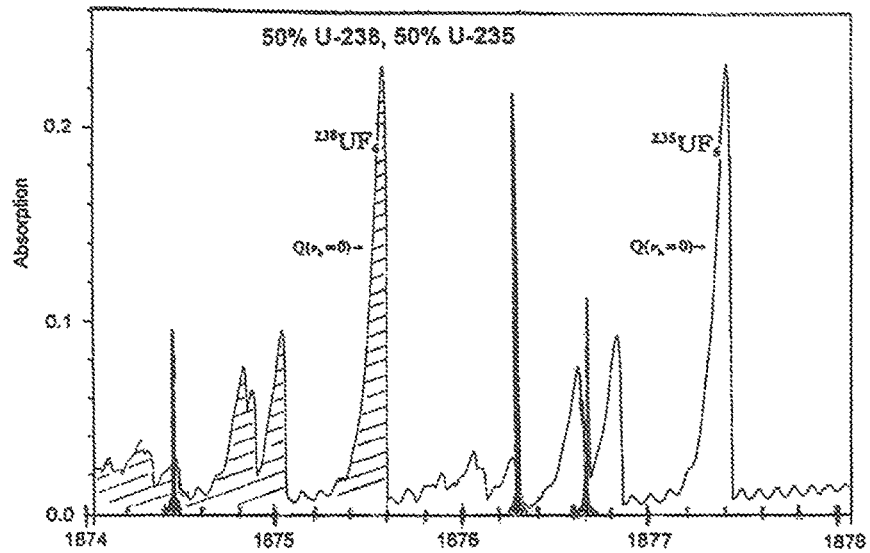
FIG. 5c shows a high-resolution spectrum of the overlap of several strong CO laser lines with a computer-calculated spectrum of the cold- and hot-band $3v_3$ vibrations of $^{238}UF_6$ and $^{235}UF_6$ at a super-cooled temperature of 100 K between 1874 and 1878 $cm^{-1}$.

FIGS. 5a, 5b and 5c show low-temperature (T=200K in FIG. 5a, 150K in FIG. 5b, 100K in FIG. 5c) computer-calculated plots of the $3v_3$ absorption spectra of $^{238}UF_6$ and $^{235}UF_6$ between 1874 and 1878 $cm^{-1}$ and the strong CO laser lines at 1874.45 ($P_9$-9), 1876.30 ($P_8$-15), and 1876.63 ($P_7$-21) $cm^{-1}$. The plots show that because of the isotope shift of 1.8 $cm^{-1}$, the cold and hot-band-shifted $3v_3$ spectra of $^{238}UF_6$ and $^{235}UF_6$ at super-cooled temperatures below 200 K are well separated. Besides showing the cold Q peaks of $3v_3$ near 1875.6 and 1877.4 $cm^{-1}$ for $^{238}UF_6$ and $^{235}UF_6$ respectively, FIGS. 5a, 5b and 5c clearly show the well-separated Q-branch peaks of the first four anharmonically shifted hot-bands of $^{238}UF_6$ and $^{235}UF_6$ due to the low-energy co-vibrations $v_6$, $v_4$, $v_5$, $2v_6$. The "cold" vibration involves a $3v_3$ excitation of a $UF_6$ molecule with no other active side vibrations on-going while the transition occurs; $UF_6$ has six normal vibrations of which the low-energy vibrations $v_4$, $v_5$, $v_6$ are easily once- or twice-excited in thermal collisions. The plots of FIGS. 5a, 5b and 5c show that the CO laser line at 1876.63 strikes the partially overlapping Q-branches of $v_4$ and $v_5$ co-vibrating hot-bands of $^{235}UF_6(3v_3)$ while the line at 1876.30 cm$^{-1}$ strikes the $2v_6$ hot-band of $^{235}UF_6(3v_3)$. The CO laser line at 1874.45 cm$^{-1}$, on the other hand, strikes the $2v_6$ hot band of the other isotope $^{238}UF_6(3v_3)$.

The CO laser line frequencies have been measured quite accurately, while the computer-calculated absorption bands of $^{238}UF_6$ and $^{235}UF_6$ are based on measured molecular vibrational constants. They were obtained with a high-resolution computer program (COMISH) that simulates octahedral $QF_6$ spectra, requiring more than thirty molecular input parameters including six (measured) anharmonic constants to calculate hot-band shifts. The calculated spectra were compared/calibrated with measured ones.

FIG. 6a shows ultra-high-resolution measurements with a laser diode of the $^{238}UF_6(3v_3)$ absorption band in the hot-band region of interest at T=257 K and p=3.5 Torr. Because $UF_6$ condenses at low temperatures and its vapor pressure is only 0.006 Torr at 200 K and around $10^{-20}$ Torr at T=100 K, very long absorption lengths through the gas are required to measure low-temperature absorption spectra of the weakly absorbing $3v_3$ vibration of gaseous $^{238}UF_6(3v_3)$. Even at T=257 K, the vapor pressure of $UF_6$ is only 3.5 Torr (=0.046 atmospheres) and to obtain sufficient spectral detail at high resolution, an absorption length of 1000 meters had to be used with a 3-meter long absorption cell and multi-path-folding minors. For this reason it is nearly impossible to measure gaseous $UF_6(3v_3)$ spectra at carrier-gas-produced super-cooled temperatures below T=250 K of milli-second durations. Thus the COMISH computer program was developed yielding the plots shown in FIGS. 5a, 5b and 5c. The $2v_6$ hot-band spectrum of $^{238}UF_6(3v_3)$ shown in FIG. 6a shows the expected typical A, B, C, D, E, F, G sub-peaks of a Q-branch as observed also for the cold $^{238}UF_6(3v_3)$ and $^{238}UF_6(v_3)$ absorption bands shown in FIG. 6b.

The measurements shown in FIG. 6a were made using natural $UF_6$ with 99.3% $^{238}UF_6$, and thus they cannot show any spectral peaks of the small 0.7% $^{235}UF_6$ fraction directly. However to assess the $2v_6$ hot-band absorption region for the $^{235}UF_6(3v_3)$ isotopomer, the wave-number scale was shifted by the measured isotope shift of 1.82 cm$^{-1}$ between $^{238}UF_6(3v_3)$ and $^{235}UF_6(3v_3)$ as shown in the upper part of FIG. 6a, assuming Q-branches of both are the same (actually there is a different hyperfine-effect which may change the sub-peak structures slightly). The strong CO laser line at 1876.30 in the upper portion of FIG. 6a shows that it should strike a sub-peak of the $2v_6$ hot-band of $^{235}UF_6(3v_3)$, while the CO laser line at 1876.63 cm$^{-1}$ should strike close to a sub-Q-peak of the overlapping $v_4$ and $v_5$ hot-bands of $^{235}UF_6(3v_3)$, in agreement with the spectral predictions shown in FIGS. 5a, 5b and 5c. The CO laser line at 1874.45 cm$^{-1}$ shown in the lower part of FIG. 6a indicates it overlaps the $2v_6$ hot-band of $^{238}UF_6(3v_3)$, also in agreement with the calculated plots shown in FIGS. 5a, 5b and 5c. Laser excitations of $UF_6(3v_3)$ are best optimized experimentally. Incomplete explorations in 1986 unequivocally showed repeated moderate $^{235}UF_6$ enrichments with CO-laser-induced $3v_3$ excitations of natural $UF_6$ (supercooled to far-from-optimum temperatures and pressures). These experiments confirm that the above-mentioned CO laser lines do strike $^{235}UF_6(3v_3)$ hot-bands at reasonably strong absorptive regions of the $UF_6$ hot-band spectrum shown in FIGS. 5a, 5b, 5c and FIG. 6a or such enrichments would not have been observed.

In a preferred embodiment of the advanced CRISLA system, for optimum CRISLA enrichment of $UF_6$, the system comprises a combination of a high-power 5-micron CO laser and a train of a hundred or more mini jet separators irradiated intra-cavity in a cross-wise fashion as shown in FIGS. 3b and 3c. The CO laser typically has a beam diameter between 1 and 15 mm and a long-path intra-cavity bi-directional circulating laser beam of 10 KW/cm$^2$ (single line) or higher. The laser must be operated on the $P_8$-15 laser line at 1876.30 cm$^{-1}$ and/or the $P_7$-21 laser line at 1876.63 cm$^{-1}$ which overlap the first four spectrally shifted low-energy hot bands of the $3v_3$ vibration with side vibrations $v_h=v_6$, $v_4$, $v_5$, or $2v_6$ of $^{235}UF_6(3v_3)$. Also the CO laser line at 1874.45 cm$^{-1}$ ($P_9$-9) may be used which overlaps the $2v_6$-hot-band-shifted $^{238}UF_6(3v_3)$ resonance.

In applications with coaxial irradiation of a series of mini-jets, the nozzle throat diameters of the mini jets must be larger (3-16 mm) to allow low-loss passage of the laser-beam. In this case of co-axial irradiation, alignment of the nozzle throats of a hundred or so adjacent mini-separators fabricated in series must be accurate to within 0.1 mm to allow clear passage of a straight 5 micron laser beam through all of the nozzles (see FIG. 3a). While a greater number of $UF_6$ molecules in the process stream may be laser-excited in a co-axial irradiation embodiment, a drawback of this intra-cavity approach besides the throat diffraction losses, is that the length of a hundred or so adjacent mini jets (see FIG. 3a) will be longer than in a cross-wise embodiment in which intra-cavity laser irradiation of a hundred jets is utilized (see FIGS. 3b and 3c). Because of excessive throat diffraction losses and longer traversing lengths as the intracavity laser beam passes through the multiple nozzle or orifice throats shown in FIG. 3a, the cross-irradiated scheme illustrated in FIGS. 3b and 3c is preferred for large-scale commercial enrichment applications.

Note that the nozzles, skimmers, chambers, pumps, traps, and all other components of the advanced CRISLA system may comprise metal, plastic, composite, ceramic, or other materials as known in the art and may be manufactured by any technique known in the art including but not limited to machining, casting, and printing.

The high-power 5-micron CO laser may be any appropriate CO laser known in the art. In particular, the high-power CO laser may comprise a liquid-nitrogen-cooled LCL-516 model made by LISCHEM which can deliver 3 to 10 kW/cm$^2$ (single line) of intracavity circulating power when run continuous (CW), or a peak pulse of 30 to 50 kW/cm$^2$ (single line) if Q-switched. For higher intensities one may construct a CO laser powered by an e-beam-assisted gas-discharge as was developed in previous high-power laser programs known to those skilled in the laser art, potentially delivering 100 kW/cm$^2$ of intra-cavity bi-directional laser power. Spectral fine-tuning of the CO laser emission lines to shift them to the Q-peaks of the aforementioned resonant absorptions of $^{235}UF_6(3v_3)$ and $^{238}UF_6(3v_3)$ may be profitable if enrichment factors can thereby be enhanced. A number of spectral-line fine-tuning techniques have been developed known to those familiar with the laser art, which may be suitable for use in CRISLA. In applying fine-tuning, care must be taken not to lower bi-directional intra-cavity laser power levels. Possible schemes developed for spectral fine-tuning or chirping include but are not limited to piezo-driven micro-vibrations of the CO laser end-mirror and/or laser grating; imposition of electric and/or magnetic fields intra-cavity across laser-irradiated process gas flows or across the CO lasing plasma; micro-wave mixing; orbital-spin manipulations of laser photons, and laser beam transmission through a non-linear optical medium in any combination.

The carrier gas G may be chosen from known inert gas molecules with a high gas constant $\gamma=C_p/C_v$. Monatomic gases have the highest $\gamma$ values ($\gamma=1.66$), and the heaviest stable member of this class is Xe with atomic mass M=133 amu. Another heavy gaseous molecule that is reasonably inert with a usable $\gamma$ is $SF_6$ with M=146 amu and $\gamma=1.30$. Still heavier carrier gases such as $SiBr_4$ with M=348 amu and $\gamma=1.1$ might be considered but they are usually more chemically reactive. The optimum dilution ratio $UF_6/G$ to obtain highest enrichments is best determined experimentally. The optimum dilution ratio depends on many pressure-dependent and temperature-dependent parameters such as VV transfer rates and dimer formation rates that vary dramatically as the process gas expands and is laser-irradiated. From prior research, it appears that a $UF_6/G$ ratio between $1/50$ and $1/5$ is reasonable but only experimental tests can pinpoint the optimum for a particular selection of carrier gas G and a particular process chamber design. The optimum downstream super-cooling temperature and pressure for maximum enrichment, which can be controlled by the nozzle-to-skimmer separation distance and by the process gas pumping speeds of separated rim and core gases, are also best determined experimentally in conjunction with the selection of carrier gas G.

Process gas pumping speeds used in CRISLA for both the rim and core gas fractions are typically between 1000 and 10,000 liters/minute, and pumps with these capacities are commercially available from Hereaus (Leybold Hereaus/Balzers; with headquarters in Cologne and Hanau, Germany, and in Liechtenstein), the Edwards corporation (headquartered in Crawley, W. Sussex, Great Britain), and other vacuum equipment companies. Cryo-trapping cells to collect and separate depleted or enriched $UF_6$ from carrier gases G like Xe or $SF_6$, can use liquid nitrogen or other suitable cryogen. These are also commercially available and their use is well-known to those skilled in the art. The advanced CRISLA system may employ any appropriate pump or trap as known in the art.

While plausible operating parameters for various embodiments of the advanced CRISLA system have been herein identified, variations of these parameters from those quoted may of course be utilized without diminishing the value or utility of the presently disclosed system and method.

Note also that while this disclosure focuses on the separation and enrichment of $UF_6$, in alternative embodiments the advanced CRISLA system may be employed to separate and enrich isotopes of other materials and elements as known in the art.

With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

I claim:

1. A process for enriching a selected isotope of uranium from a mixture of gaseous $UF_6$ isotopomers in a supersonic low-pressure flow chamber, comprising the steps of:
   a. super-cooling multiple axisymmetric supersonic free jets comprising $UF_6$ and carrier gases by adiabatic expansion of said gases from a common feed chamber into a common flow chamber through multiple inlet nozzles and in each of said supersonic free jets, thereby creating an axisymmetric supersonic jet core flow surrounded radially by a barrel shaped shock region and subsonic chamber-background rim gas;
   b. selectively exciting isotopomers of $UF_6$ in a mixture of $UF_6$ and carrier gases using photons and providing via said multiple jets acting together, an increased total peripheral escape surface area for said selectively excited UF6 isotopomers entering said chamber background rim gas;
   c. separating said supersonic jet core flows in each of said multiple jets from said subsonic chamber-background rim gas, by capturing said supersonic jet-core flows in said free jets with recovery skimmers, each said skimmer located opposite each inlet nozzle so as to intercept each supersonic core flow of each supersonic free jet; and
   d. wherein said multiple inlet nozzles producing said supersonic free jets are spaced apart in line internally on one side of said flow chamber, and wherein each of said skimmers is paired with one of said inlet nozzles and is located a distance away opposite said one of said gas inlet nozzles on the other internal side of said flow chamber.

2. The process of claim 1, wherein the supersonic free jets comprise a mixture of carrier gases G and $UF_6$ in a predetermined $UF_6/G$ molecular ratio.

3. The process of claim 1, wherein the selected uranium isotope is one of U-232, U-233, U-234, U-235, U-236, U-237, or U-238.

4. The process of claim 1, wherein said supersonic free jets enter said flow chamber from a feed chamber having a gas pressure at least twice that of the flow chamber.

5. The process of claim 4 wherein said supersonic free jets enter said flow chamber via one of: a Laval nozzle and an open orifice connecting said feed chamber to said flow chamber.

6. The process of claim 1, wherein said skimmers separate said rim gas from said supersonic core flows of said supersonic free jets and said rim gas is pumped out separately from said supersonic core flows of said supersonic free jets.

7. The process of claim 2, wherein said carrier gas G comprises a heavy chemically inert gaseous molecule with a high gas coefficient $\gamma=C_p/C_v$.

8. The process of claim 2, wherein said carrier gas G is one of Xe, Rn, $SF_6$, and $SiBr_4$.

9. The process of claim 2, wherein said carrier gas G is a mixture of two gases Y and Z, wherein Y comprises one of He, Ar, and $N_2$, and Z comprises one of Xe, $SF_6$, and $SiBr_4$.

10. The process of claim 2, wherein the predetermined $UF_6/G$ molecular ratio is between $1/100$ and $1/5$.

11. The process of claim 1, wherein said photons are produced by selected emission lines from a 5-micron CO laser.

12. The process of claim 11, wherein said selected emission lines overlap the absorption lines of the $3v_3$ excited vibrations of $UF_6$.

13. The process of claim 11, wherein said selected emission lines are the $P_8$-15 line at 1876.30 cm$^{-1}$ and the $P_7$-21 line at 1876.63 cm$^{-1}$ whose frequencies overlap the absorption lines of the $3v_3$ hot-band vibrations of $^{235}UF_6$ with hot co-vibrations $v_h=v_6$, $v_4$, $v_5$, and $2v_6$.

14. The process of claim 11, wherein said selected emission line is the $P_9$-9 line at 1874.45 cm$^{-1}$ whose frequency overlaps the absorption line of the $3v_3$ hot-band vibration of $^{238}UF_6$ with hot co-vibration $v_h=2v_6$.

15. The process of claim 11, wherein said selected emission lines are produced by a resonator mirror set comprising a cooled suitably-angled ruled diffraction grating at a first end and a cooled retro mirror with substantially 100% reflectivities at a second end, between which said laser beam is generated traversing bidirectionally through a laser plasma gain section and through said supersonic free jets inside an intracavity flow chamber.

16. The process of claim 15, wherein said supersonic free jets have supersonic free jet axes and wherein said laser beam crosses said free jet axes cross-wise.

17. The process of claim 11, wherein said 5-micron CO laser is a high-power continuous (CW) running CO laser.

18. The process of claim 11, wherein said 5-micron CO laser is a high-peak-power pulsed CO laser and the flows of said supersonic jets are pulsed in synchronization with said CO laser pulses.

19. The process of claim 15, wherein said laser beam has an intra-cavity bi-directional intensity equaling or exceeding 3 kW per cm$^2$ for a single grating-selected laser line.

20. The process of claim 11 wherein a selected emission line from said CO laser is ultra-fine frequency-shifted to coincide with one of the peak Q-branch absorptions of the selected $UF_6$ isotopomer.

* * * * *

UNITED STATES PATENT AND TRADEMARK OFFICE
CERTIFICATE OF CORRECTION

PATENT NO.        : 10,319,486 B2
APPLICATION NO.   : 14/207333
DATED             : June 11, 2019
INVENTOR(S)       : Jozef W. Eerkens It is certified that error appears in the above-identified patent and that said Letters Patent is hereby corrected as shown below:

In the Specification

In Column 7, Lines 61-62, the corrected language should read as originally filed and as follows:
While one can maximize $\sigma_a$ only some hundred-fold by gas-cooling and laser-line matching, the only possibility to increase $k_L$ further is to increase $\varphi_L$. In the new advanced CRISLA process, such maximization of $\varphi_L$ is achieved by placing the $UF_6/G$ jets internal to the laser resonator cavity, and insuring that the resonator end-mirrors, comprising a total mirror and a laser-line-frequency selecting grating, have the highest possible reflectivities (R) in the near-infrared at 5 microns.

In Column 10, Line 16, the molecule $^{232}UF_{65}$ should read $^{232}UF_6$.

Signed and Sealed this
Twenty-third Day of July, 2019

Andrei Iancu
*Director of the United States Patent and Trademark Office*